Sept. 21, 1937.  N. V. LINGER  2,093,980
ELECTRIC TEAPOT
Filed July 22, 1936

Nellie Victoria Linger
INVENTOR
BY Victor J. Evans & Co.
ATTORNEYS

Patented Sept. 21, 1937

2,093,980

UNITED STATES PATENT OFFICE 2,093,980

ELECTRIC TEAPOT

Nellie Victoria Linger, Kings Park, N. Y.

Application July 22, 1936, Serial No. 91,952

2 Claims. (Cl. 53—3)

This invention relates to electric teapots and has for an object to provide an improved utensil of this character which will produce an infuse beverage of predetermined strength or quality, for this purpose the container for the tea leaves being provided with a scale graduated in teaspoonfuls whereby a predetermined measured quantity of tea may be inserted in the container without resorting to extraneous devices.

A further object is to provide a neat, attractive teapot having an electric heater in the bottom and having a container for the tea leaves mounted axially in the teapot and detachably supported in position by a novel diaphragm which itself is located in position by the cover of the teapot so that a rigid assembly of the parts is produced.

A further object is to provide an electric teapot which will be formed of a few strong, durable and inexpensive parts, which will be easy to manufacture, which may be easily kept in a sanitary condition in that all of the parts are separable and easy of access, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1:
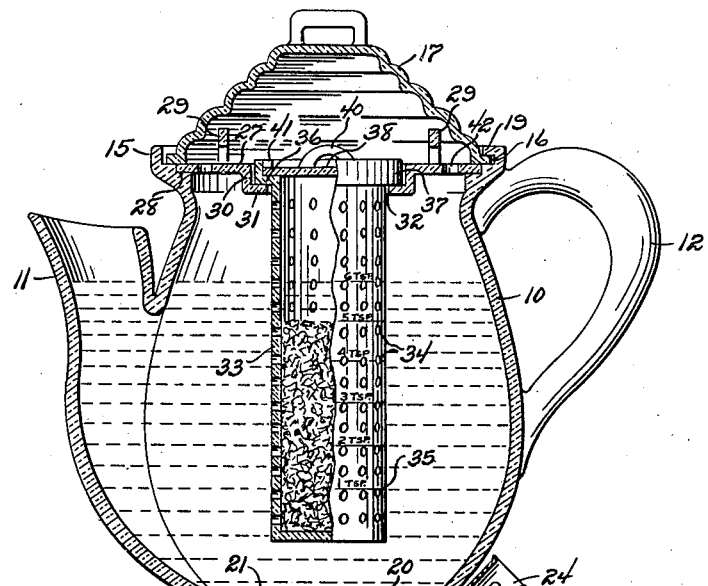
Figure 1 is a longitudinal sectional view through a teapot constructed in accordance with the invention.
Figure 3:
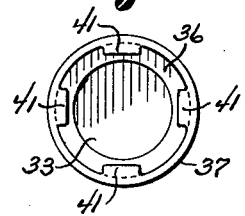
Figure 3 is a plan view of the container.

Referring now to the drawing in which like characters of reference designate similar parts in the various views, 10 designates a teapot having a spout 11 and a handle 12 opposite the spout, there being a cylindrical depression 13 in the bottom of the teapot which is integral with a stand 14 upon which the teapot is supported. The top of the teapot is provided with a circumferential retaining flange 15 which receives the bottom flange 16 of the teapot cover 17, there being a notch 18 in the cover flange which may be brought into registration with a lip 19 on the teapot flange 15 to permit application to and removal of the cover. These parts may be formed of heat resisting glass, crockery, or other suitable material.

A casing 20, preferably of chrome metal, is received in the cylindrical depression 13 in the bottom of the teapot and the top face of the casing is flush with the top of the depression as shown. An electric heating coil 21 is mounted in the casing and the terminals of the coil are connected to binding posts 22 which anchor the casing to the bottom of the teapot and to which terminal prongs 23 of a socket 24 are attached to conduct the electric current to the heating coil. A disc 25 of insulating material is mounted on projections 26 within the stand 14 to insulate the binding posts 22.

A diaphragm 27, preferably formed of heat resisting glass, crockery, or other suitable material, is seated in a circular recess 28 in the open top of the teapot and is provided at diametrically opposite points with spaced grips 29 by means of which the diaphragm may be applied and removed from the teapot. The marginal flange 16 of the cover 17 of the teapot seats upon the top face of the diaphragm and clamps the diaphragm firmly in its seat. The diaphragm is provided with a central cylindrical depression 30 having a bottom wall 31 provided with a central opening 32.

A cylindrical container 33 is mounted axially in the teapot, the container being also preferably formed of heat resisting glass or other suitable material and being provided with perforations 34 through which the hot water in the teapot gains access to the interior of the container to saturate the tea leaves in the usual manner and produce the tea infusion. The container is provided with a vertical scale 35 graduated in teaspoonfuls so that the container may be filled with the tea leaves at a predetermined level in order to produce a desired strength or quality of infusion without resorting to extraneous measuring devices.

Figure 4:
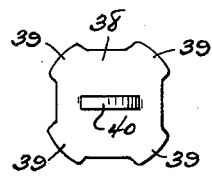
Figure 4 is a plan view of the cover of the container.
Figure 2:
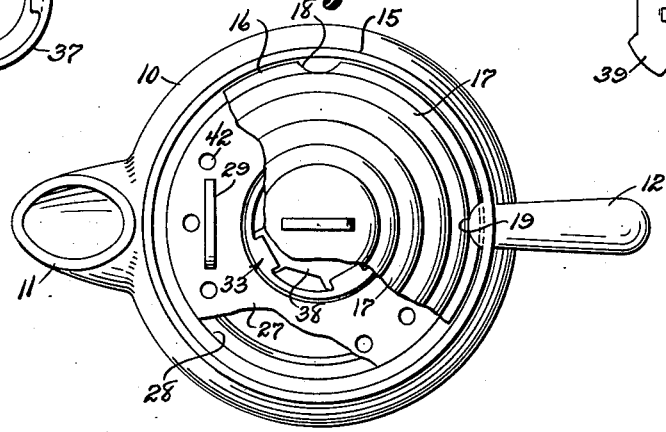
Figure 2 is a plan view of the teapot shown in Figure 1 with parts broken away.

The upper end of the container is provided with an outstanding flange 36 which terminates in an upstanding flange 37. The outstanding flange rests upon the bottom wall 31 of the diaphragm to support the container axially in the teapot. A disc cover 38 for the container is supported on the outstanding flange 36 and is provided with projections 39, best shown in Figure 4, and is also provided with a handle 40. The projections 39 are engageable underneath lips 41 which project inwardly from the upstanding flange 37 of the container to clamp the cover to the container. By rotating the cover to an angular position the projections 39 of the cover may be brought into register with the spaces between the lips 41 of the container to apply and remove the cover.

Vent openings 42 are formed in the diaphragm 27 to vent the interior of the teapot to the teapot cover 17.

From the above description it will be seen that the container 33, and diaphragm 27, as well as the cover 17 of the teapot, are all readily assembled and disassembled so that the teapot may be maintained in a sanitary condition and when assembled, the parts are clamped firmly together to present a rigid assembly.

What is claimed is:

1. A teapot having a depression in the bottom and having the top provided with a circumferential retaining flange, a cover seated on said flange, a diaphragm seated on the flange below the cover and having a central depression provided with a bottom having a central opening, a perforated container mounted axially in said opening and having an outstanding flange terminating in an upstanding flange, the outstanding flange bearing upon the bottom of said depression, a disc cover for the container supported upon the outstanding flange and provided with projections, there being projections on said outstanding flange adapted to engage over the projections of the cover and clamp the cover to the container, and heating means in said depression in the bottom of the teapot.

2. A teapot having a supporting flange at the open top thereof, a diaphragm on said flange, a cover on said flange overlapping the diaphragm, interengaging means between said flange and the cover for clamping the cover and the diaphragm to said flange, a handle on the diaphragm, there being a central opening in the diaphragm, a cylindrical perforated container engaged through the diaphragm and having a flange engaging the diaphragm and supporting the container thereon, there being a scale marked on the container for measuring predetermined quantities of tea leaves from which the tea infusion is to be made, and a cover for the container.

NELLIE VICTORIA LINGER.